(12) United States Patent
Lee et al.

(10) Patent No.: US 10,493,897 B2
(45) Date of Patent: *Dec. 3, 2019

(54) MOISTURE-ELECTROLYZING APPARATUS FOR LAMP

(71) Applicants: Hyundai Motor Company, Seoul (KR); Kia Motors Corporation, Seoul (KR)

(72) Inventors: Sang Shin Lee, Suwon-si (KR); Jae Woo Park, Ansan-si (KR); So Yoon Park, Suwon-si (KR); Man Ju Oh, Yongin-si (KR); Jae Woong Kim, Hwaseong-si (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/624,423

(22) Filed: Jun. 15, 2017

(65) Prior Publication Data

US 2018/0162261 A1 Jun. 14, 2018

(30) Foreign Application Priority Data

Dec. 14, 2016 (KR) .......................... 10-2016-0170844

(51) Int. Cl.
*C25D 17/10* (2006.01)
*C25D 17/12* (2006.01)
(Continued)

(52) U.S. Cl.
CPC .......... *B60Q 1/0005* (2013.01); *B01D 53/261* (2013.01); *C25B 1/04* (2013.01); *C25B 9/06* (2013.01); *C25B 11/035* (2013.01)

(58) Field of Classification Search
CPC ........... C25B 15/00; C25B 15/02; C25B 9/00; C25B 9/18; C25B 9/04; C25B 9/16
(Continued)

(56) References Cited

U.S. PATENT DOCUMENTS 4,147,947 A * 4/1979 Hoeh ................... F21V 17/007
313/27
6,621,212 B1 * 9/2003 Pennaz ................. H05B 33/04
257/103
(Continued)

FOREIGN PATENT DOCUMENTS

KR 10-1998-0044556 A 9/1998

*Primary Examiner* — Zulmariam Mendez
(74) *Attorney, Agent, or Firm* — Morgan, Lewis & Bockius LLP

(57) ABSTRACT

A moisture-electrolyzing apparatus for a lamp, may include a first electrode, connected to an electrode of a power source and exposed to an internal space of a lamp housing; a second electrode, connected to another electrode of the power source and exposed to the internal space of the lamp housing, with a gap formed between the first electrode and the second electrode; a dielectric, applied to a surface of either the first electrode or the second electrode, the surface facing a remaining one of the first electrode or the second electrode; and an electric discharge passage, formed between the first electrode and the second electrode, in which air in the lamp circulates and in which moisture in the air is electrolyzed by electric discharge occurring between the first electrode and the second electrode.

8 Claims, 3 Drawing Sheets

(51) Int. Cl.
*C25D 17/02* (2006.01)
*C25D 7/04* (2006.01)
*C25B 15/00* (2006.01)
*C25B 9/00* (2006.01)
*C25B 9/12* (2006.01)
*B60Q 1/00* (2006.01)
*C25B 9/06* (2006.01)
*C25B 11/03* (2006.01)
*C25B 1/04* (2006.01)
*B01D 53/26* (2006.01)

(58) Field of Classification Search
USPC .................................................. 204/262, 280
See application file for complete search history.

(56) References Cited

U.S. PATENT DOCUMENTS

2004/0032208 A1* 2/2004 Wu ..................... H05B 33/10
 313/509
2015/0070927 A1* 3/2015 Kurahashi .............. B01D 53/26
 362/546

* cited by examiner

MOISTURE-ELECTROLYZING APPARATUS FOR LAMP

CROSS-REFERENCE(S) TO RELATED APPLICATIONS

The present application claims priority to Korean Patent Application No. 10-2016-0170844, filed Dec. 14, 2016, the entire contents of which is incorporated herein for all purposes by this reference.

BACKGROUND OF THE INVENTION

Field of the Invention

The present invention relates to an apparatus for removing moisture from a lamp in which moisture can be removed by electrolysis, thereby preventing the moisture from condensing into water.

Description of Related Art

The internal space of an automotive headlamp is heated to a high temperature when its light source is activated. The wind produced upon driving or the environment surrounding the automotive headlamp makes the outer surface of the lamp cooler than the internal space. Due to the present temperature difference, moisture within the lamp may reach a dew point, condensing on the lamp lens. The subsequent drops flowing on the lens may corrode and damage parts near the lens. In addition, after the moisture repeatedly undergoes condensation and evaporation, the lens is stained and turns hazy, with the consequent decrease in lamp luminance.

Such problems are conventionally solved by disposing a fan within an automotive headlamp to forcibly circulate air within the lamp or by vacuumizing the internal space of the lamp. However, these conventional solutions suffer from the following disadvantages: the operation of the fan requires additional energy consumption; and a vacuum sealed headlamp increases the cost not only for production but also for repair. For example, when only the replacement of the light source is needed, a vacuumed lamp must be changed in its entirety, thereby increasing the repair cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

The present invention is directed to provide an apparatus for removing moisture from a lamp by electrolysis, whereby the problem of moisture condensing within the lamp can be solved and the moisture can be prevented from condensing.

To accomplish the above aspects, the present invention is directed to provide a moisture-electrolyzing apparatus for a lamp, including: a first electrode, connected to an electrode of a power source and exposed to an internal space of a lamp housing; a second electrode, connected to another electrode of the power source and exposed to the internal space of the lamp housing, with a gap formed between the first electrode and the second electrode; a dielectric, applied to a surface of either the first electrode or the second electrode, the surface facing the remaining one of the first electrode or the second electrode; and an electric discharge passage, formed between the first electrode and the second electrode in which air in the lamp circulates, and in which moisture in the air is electrolyzed by an electric discharge occurring between the first electrode and the second electrode.

In an embodiment of the present invention, the first electrode and the second electrode each have a plurality of through-holes formed therein.

In another embodiment of the present invention, the through-holes in the first electrode are positioned in such a manner that they alternate with those in the second electrode.

In another embodiment of the present invention, the first electrode is of a dome shape extruded from the lamp housing, and the second electrode is formed in a dome shape covering the first electrode at a predetermined distance from the first electrode.

In another embodiment of the present invention, a moisture absorbent is disposed in a gap between the first electrode and the housing.

In another embodiment of the present invention, the apparatus further includes an absorbent sheet attached onto one surface of the second electrode.

In another embodiment of the present invention, the apparatus further includes a thermal conductor penetrating through the lamp housing, which has one surface exposed to the inner space of the first electrode and an opposite surface on which cooling fins are formed.

In another embodiment of the present invention, the apparatus further includes an insulating housing for thermally insulating the lamp housing from the thermal conductor, on which the first electrode and the second electrode are fixed with a predetermined gap maintained therebetween.

In another embodiment of the present invention, the dielectric is an ionomer.

In another embodiment of the present invention, the dielectric is formed by impregnating a polytetrafluoroethylene (PTFE) membrane with an ionomer.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
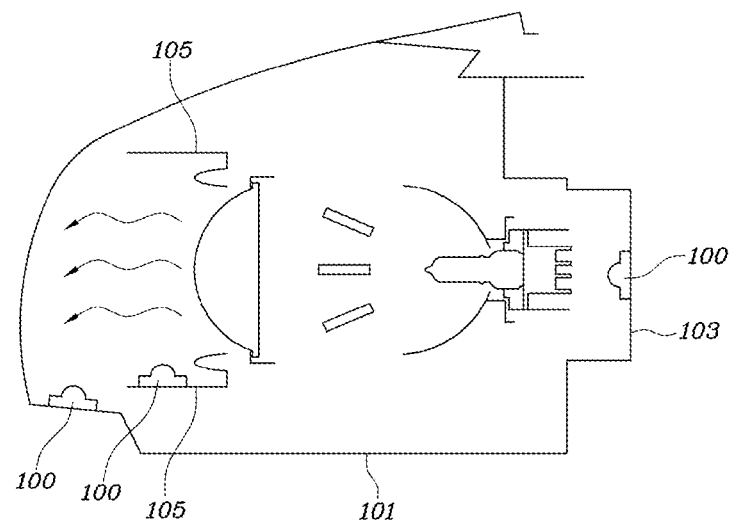
FIG. 1 is a conceptual view of a moisture-electrolyzing apparatus for an automotive headlamp in accordance with an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
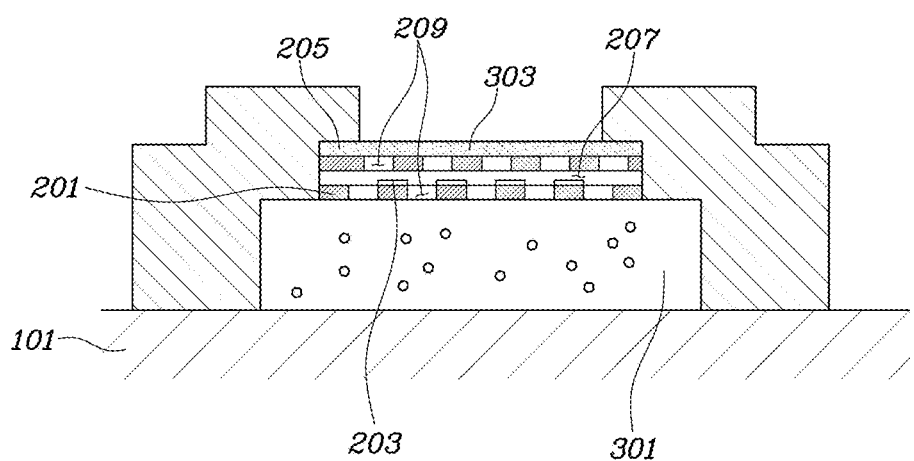
FIG. 2 is a cross-sectional view of a moisture-electrolyzing apparatus for an automotive headlamp in accordance with an exemplary embodiment of the present invention.
Figure 3:
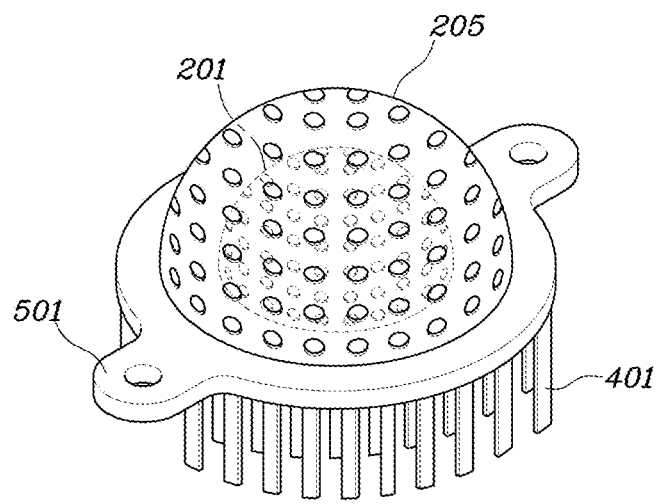
FIG. 3 is a perspective view of a moisture-electrolyzing apparatus for an automotive headlamp in accordance with an exemplary embodiment of the present invention.
Figure 4:
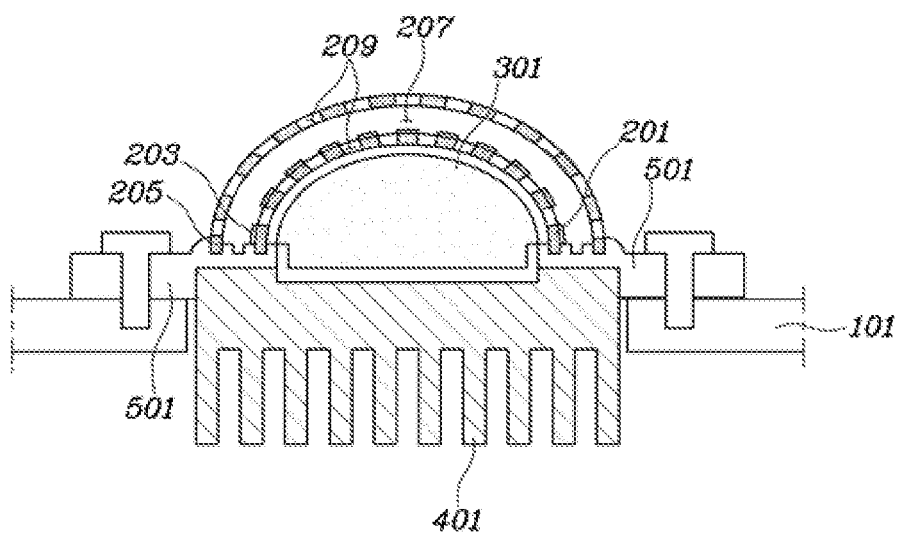
FIG. 4 is a cross-sectional view of a moisture-electrolyzing apparatus for an automotive headlamp in accordance with another exemplary embodiment of the present invention.
Figure 5:
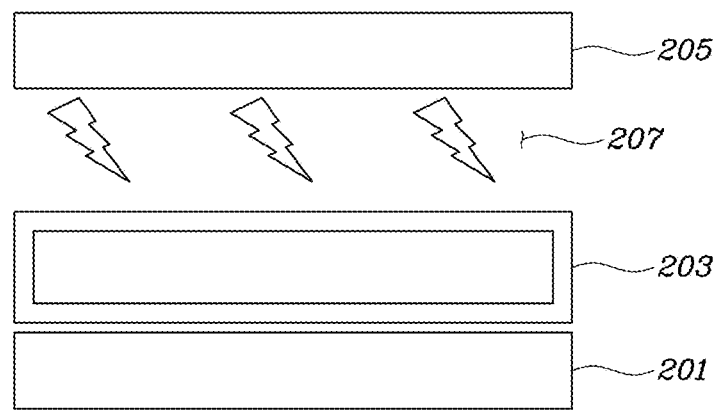
FIG. 5 is a conceptual view of a moisture-electrolyzing apparatus for an automotive headlamp in accordance with another exemplary embodiment of the present invention.

FIG. 1 is a conceptual view of a moisture-electrolyzing apparatus for an automotive headlamp in accordance with an embodiment of the present invention. FIG. 2 is a cross-sectional view of a moisture-electrolyzing apparatus for an automotive headlamp in accordance with an embodiment of the present invention. FIG. 3 is a perspective view of a moisture-electrolyzing apparatus for an automotive headlamp in accordance with an embodiment of the present invention. FIG. 4 is a cross-sectional view of a moisture-electrolyzing apparatus for an automotive headlamp in accordance with another embodiment of the present invention. FIG. 5 is a conceptual view of a moisture-electrolyzing apparatus for an automotive headlamp in accordance with an embodiment of the present invention.

With reference to FIG. 1 to FIG. 5, a moisture-electrolyzing apparatus 100 for a lamp is illustrated in accordance various embodiments of the present invention. The moisture-electrolyzing apparatus 100 includes: a first electrode 201, connected to an electrode of a power source and exposed to an internal space of a lamp housing 101; a second electrode 205, connected to another electrode of the power source and exposed to the internal space of the lamp housing 101, with a gap formed between the first electrode 201 and the second electrode 205; a dielectric 203 applied to a surface of either the first electrode 201 or the second electrode 205, the surface facing the remaining one of the first or the second electrode; and an electric discharge passage 207, formed between the first electrode 201 and the second electrode 205 in which air in the lamp circulates, and in which moisture in the air is electrolyzed by an electric discharge occurring between the first electrode 201 and the second electrode 205.

There are two methods of lowering the humidity in a space: humidity is lowered relatively by increasing the temperature in the space or absolutely by directly removing moisture from the space. Lowering the relative humidity is not an ideal solution because the moisture condenses as the temperature of the lamp decreases. Accordingly, the present invention aims to eliminate the moisture within the lamp via electrolysis.

Generally, electrolysis is conducted by flowing electricity through liquid in the presence of an electrolyte. General electrolysis cannot be applied to the removal of moisture from an automotive headlamp because there is not enough moisture to flow electricity thereacross.

Thus, in the present invention, moisture in air is electrolyzed by inducing an electric discharge at a low voltage.

Referencing FIG. 1, the moisture-electrolyzing apparatus 100 for a lamp can be freely disposed within the lamp housing 101 when an area is secured. Preferably, the apparatus may be disposed at a position that is not directly visible through the lamp to improve aesthetics. For example, the apparatus may be positioned at a lower end of the lamp housing 101, a bezel 105 of the lamp, or a dust cover 103.

With reference to FIG. 2 to FIG. 4, the first electrode 201 is connected to an electrode of a power source and is disposed to be exposed to an internal space of the lamp housing 101 while the second electrode 205 is disposed at a distance from the first electrode 201. An electric current, although generally flowing through a conductive continuous wire, can flow through a gap between isolated conductive wires in the presence of a high voltage. When a high voltage is applied between two isolated wires, electrons may jump over the gap therebetween, forming an electrical discharge. However, to produce a high enough voltage to induce direct discharge in a car is difficult. In addition, it is undesirable to induce electric discharge at a high voltage due to the presence of numerous sensitive electric parts in a car. Hence, it is necessary to induce electric discharge at a low voltage.

The present case is why the dielectric 203 is needed. Referring to FIG. 5, the dielectric 203 is applied to an electrode surface, allowing an electric discharge to uniformly occur across the electrode surface, and making electron emission easy even at a low voltage.

The gap formed between the first electrode 201 and the second electrode 205 is configured as the electric discharge passage 207 through which the air of the lamp passes through. In the passage electric discharge occurs. The moisture contained in the air is electrolyzed in the gap, thereby lowering absolute humidity in the internal space of the lamp.

A plurality of through-holes 209 may be formed in each of the first electrode 201 and the second electrode 205. The through-holes 209 in the first electrode 201 may be positioned in such a manner that they alternate with those in the second electrode 205.

The gap between the first electrode 201 and the second electrode 205, configured as the electric discharge passage 207, is very narrow. When the gap is wide, the air filling the gap functions as an insulator, and thus increases resistance making a low-voltage discharge difficult. Accordingly, the gap is formed to have a width of up to several millimeters. Given such a narrow gap, the electric discharge passage 207 may not allow air to pass therethrough.

Hence, as shown in FIG. 2 to FIG. 4, a plurality of through-holes 209 are formed in the electrodes themselves, in accordance with the present invention, so that air is smoothly supplied into the electric discharge passage 207. In addition, the through-holes are formed at alternating positions, rather than at corresponding positions, in the first electrode 201 and the second electrode 205 to increase the residence time of the air introduced through the through-holes, with the aim of securing sufficient time to electrolyze moisture in the air.

The first electrode 201 may be of a dome shape extruded from the lamp housing 101, and the second electrode 205 may also be formed in a dome shape covering the first electrode 201 at a predetermined distance from the first electrode 201. A moisture absorbent 301 may be disposed in the gap between the first electrode 201 and the housing.

There might not be any problems when the moisture within the lamp is completely electrolyzed by the moisture-electrolyzing apparatus 100. However, significant time is required for the moisture in the lamp to spontaneously diffuse into the apparatus and then be electrolyzed. In addition, when the moisture-electrolyzing apparatus does not operate while the car is not running, a long time period is required to remove the moisture.

For the present case, the moisture absorbent 301 is configured to dehumidify the internal space of the lamp. However, the moisture absorbent 301 reaches a dehumidification limit with time due to its limited quantity.

The moisture absorbent 301, acting as a desiccant, may be made of calcium chloride or silica gel. These materials absorb moisture from the air, but release the retained moisture when external heat is applied thereto.

In the present invention, heat is generated from the first electrode 201 and the second electrode 205 while an electric field is applied between the first electrode 201 and the second electrode 205 to induce electric discharge. The heat causes the moisture absorbent 301 to release the moisture retained therein. The released moisture is removed by electrolysis when it passes through the electric discharge passage 207.

Particularly, the moisture-electrolyzing apparatus for an automotive lamp in accordance with the present invention has a structure in which the first electrode 201 and the second electrode 206, as shown in FIG. 3 and FIG. 4, are formed into respective domes, with the second electrode 205 covering the first electrode 201 while the moisture absorbent 301 is disposed in the internal portion formed by the first electrode 201. In the present structure, the moisture released from the moisture absorbent 301 is allowed to pass through the electric discharge passage 207, thereby increasing the efficiency of the electrolysis of moisture.

Further, the moisture absorbent 301 can be reused when the moisture retained in the moisture absorbent 301 is removed.

The apparatus may further include an absorbent sheet 303 attached to one surface of the second electrode 205.

Condensation in the housing 101 is readily absorbed into the absorbent sheet 303, and subsequently evaporated into moisture by the heat generated during an operation of the moisture-electrolyzing apparatus 101. Of course, the moisture is removed by electrolysis.

In various embodiments of the present invention, the apparatus may further include a thermal conductor 401 penetrating through the lamp housing 101. The thermal conductor 401 has one surface exposed to the inner portion of the first electrode 201, and an opposite surface on which cooling fins are formed.

Due to the heat of the light source lamp and the greenhouse effect, the exterior of the lamp housing 101 has a relatively low temperature compared to the interior. Hence, the thermal conductor 401 thermally connects the relative cold of the exterior to the lamp housing 101 so that moisture within the lamp readily condenses on the surface exposed to the inner portion of the first electrode 201.

The condensation is absorbed into the absorbent 301, and is released as moisture by the heat generated during an operation of the moisture-electrolyzing apparatus 100. The moisture is also electrolyzed by the apparatus.

According to various embodiments of the present invention, the apparatus may further include an insulating housing 501 for thermally insulating the lamp housing 101 from the thermal conductor 401, on which the first electrode 201 and the second electrode 205 are fixed with a predetermined distance maintained therebetween.

In the apparatus of the present invention, the formation of a short circuit by direct contact between the first electrode 201 and the second electrode 205 must be avoided, and thermal transmission from the thermal conductor 401 to the lamp housing 101 must be prevented. Thus, as shown in FIG. 3 and FIG. 4, the insulating housing 501 is configured to fix the first electrode 201 and the second electrode 205 thereon at a predetermined distance from each other and to thermally block the thermal conductor 401 from the lamp housing 101.

According to an embodiment of the present invention, the dielectric 203 may be an ionomer.

Helping electrons move, the dielectric 203 contributes to the effective induction of an electric discharge even at a low voltage.

An ionomer is a polymer containing negative or positive charges. In more detail, the polymer is a thermoplastic material containing both covalent bonds and ionic bonds, featuring an excellent electrostatic force. An ionomer, although fundamentally exhibiting dielectric and insulation properties, aids electron motion due to its excellent electrostatic force, promoting electric discharge at low voltages.

The dielectric 203 may be formed by impregnating an ionomer into a PTFE membrane.

Because the apparatus is mounted within the automotive lamp, the dielectric 203 must be durable enough to maintain its performance even upon exposure to various temperature changes, high humidity, and severe vibration.

The porous Teflon film PTFE does not change in chemical properties at high temperatures (300° C. or higher), and does not readily peel off when plated. Accordingly, an ionomer-impregnated PTFE is applied to the electrode so that the dielectric 203 can retain excellent electrostaticity, with high durability.

As described hitherto, the moisture-electrolyzing apparatus for a lamp in accordance with the present invention can remove moisture, which easily condenses by electrolysis, whereby the lamp can be prevented from performing poorly and the condensation of moisture can be avoided even when highly humid air is introduced into the lamp during the exchange or repair of a light bulb.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "forwards", and "backwards" are used to describe features of the exemplary embodiments with reference to the positions of such features as displayed in the figures, The foregoing descriptions of specific exemplar embodiments of the present invention have been presented for purpose of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A moisture-electrolyzing apparatus for a lamp, comprising:
   a first electrode, connected to an electrode of a power source and exposed to an internal space of a lamp housing;

a second electrode, connected to another electrode of the power source and exposed to the internal space of the lamp housing, with a gap formed between the first electrode and the second electrode;

a dielectric, applied to a surface of either the first electrode or the second electrode, the surface facing a remaining one of the first electrode or the second electrode; and an electric discharge passage, formed between the first electrode and the second electrode, in which air in the lamp circulates and in which moisture in the air is electrolyzed by electric discharge occurring between the first electrode and the second electrode, wherein the first electrode and the second electrode each have a plurality of through-holes formed therein, and wherein the first electrode is of a dome shape extruded from the lamp housing, and the second electrode is formed in a dome shape covering the first electrode at a predetermined distance from the first electrode.

2. The moisture-electrolyzing apparatus of claim 1, wherein the through-holes in the first electrode are disposed alternate with the through-holes in the second electrode.

3. The moisture-electrolyzing apparatus of claim 1, wherein a moisture absorbent is provided in a gap between the first electrode and the housing.

4. The moisture-electrolyzing apparatus of claim 1, further including an absorbent sheet attached onto one surface of the second electrode.

5. The moisture-electrolyzing apparatus of claim 1, further including a thermal conductor penetrating through the lamp housing, which has one surface exposed to an internal portion of the first electrode and an opposite surface on which cooling fins are formed.

6. The moisture-electrolyzing apparatus of claim 5, further including an insulating housing for thermally insulating the lamp housing from the thermal conductor, on which the first electrode and the second electrode are fixed, with a predetermined gap maintained therebetween.

7. The moisture-electrolyzing apparatus of claim 1, wherein the dielectric is an ionomer.

8. The moisture-electrolyzing apparatus of claim 1, wherein the dielectric is formed by impregnating a polytetrafluoroethylene (PTFE) membrane with an ionomer.

* * * * *